US009746127B2

United States Patent
Angel et al.

(10) Patent No.: US 9,746,127 B2
(45) Date of Patent: Aug. 29, 2017

(54) FRAME WITH COMPRESSION AND TENSION MEMBERS TO ROTATE EQUIPMENT ABOUT AN AXIS

(71) Applicant: THE ARIZONA BOARD OF REGENTS ON BEHALF OF THE UNIVERSITY OF ARIZONA, Tucson, AZ (US)

(72) Inventors: Roger P Angel, Tucson, AZ (US); Brian Cuerden, Green Valley, AZ (US); Andrew R Whiteside, Tucson, AZ (US)

(73) Assignee: THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 15/030,692

(22) PCT Filed: Oct. 21, 2014

(86) PCT No.: PCT/US2014/061584
§ 371 (c)(1),
(2) Date: Apr. 20, 2016

(87) PCT Pub. No.: WO2015/061323
PCT Pub. Date: Apr. 30, 2015

(65) Prior Publication Data
US 2016/0238189 A1    Aug. 18, 2016

Related U.S. Application Data

(60) Provisional application No. 61/894,337, filed on Oct. 22, 2013.

(51) Int. Cl.
*F16M 11/18*    (2006.01)
*F16M 11/08*    (2006.01)
(Continued)

(52) U.S. Cl.
CPC ............. *F16M 11/18* (2013.01); *F16M 11/08* (2013.01); *F16M 11/22* (2013.01); *F16M 13/02* (2013.01);
(Continued)

(58) Field of Classification Search
CPC ........ F16M 11/18; F16M 11/08; F16M 13/02; F16M 11/22; F24J 2/5264; F24J 2/5403;
(Continued)

(56) References Cited

U.S. PATENT DOCUMENTS 608,755 A    8/1898  Cottle
642,196 A    1/1900  Belcher
(Continued)

FOREIGN PATENT DOCUMENTS

CN    2597897    1/2004
CN    2599483    1/2004
(Continued)

OTHER PUBLICATIONS

International Preliminary Report on Patentability dated May 6, 2016 from corresponding International Application PCT/US2014/061584.
(Continued)

*Primary Examiner* — Muhammad Ijaz
(74) *Attorney, Agent, or Firm* — Snell & Wilmer L.L.P.

(57) ABSTRACT

An apparatus is disclosed for rotating equipment, like solar panels, about an axis. Tension and compression members, in a rigid structure, are employed in the apparatus to minimize weight and to maximize stiffness. The rotating equipment is attached to the upper end of a rotatable elongated compression member, rotatably supported at its lower end by a tri-pod base comprising three additional compression members. Six tension members extending up from the tripod base hold a flange through which passes the rotatable elongated
(Continued)

compression member. Lateral forces on the rotatable equipment are transmitted to the tripod base through the six tension members. The apparatus is configured such that wind forces and torques on the rotated equipment are transmitted by the apparatus to ground supports. Solar panels supported by the apparatus may be held at a fixed tilt angle, or an additional mechanism may be provided for rotational about a second orthogonal axis.

10 Claims, 11 Drawing Sheets

(51) Int. Cl.
    *F24J 2/52*      (2006.01)
    *F24J 2/54*      (2006.01)
    *H02S 20/32*      (2014.01)
    *F16M 11/22*      (2006.01)
    *F16M 13/02*      (2006.01)

(52) U.S. Cl.
    CPC ............. *F24J 2/5264* (2013.01); *F24J 2/542* (2013.01); *F24J 2/5403* (2013.01); *H02S 20/32* (2014.12); *F24J 2002/5458* (2013.01); *Y02E 10/47* (2013.01)

(58) Field of Classification Search
    CPC .... F24J 2/542; F24J 2002/5458; H02S 20/32; Y02E 10/47
    USPC ................... 248/163.1, 431, 440, 440.1, 156
    See application file for complete search history.

(56) References Cited

U.S. PATENT DOCUMENTS

| | | | |
|---|---|---|---|
| 670,917 A * | 3/1901 | Eneas | F24J 2/5427 126/603 |
| 811,274 A * | 1/1906 | Carter | F24J 2/07 126/651 |
| 2,661,672 A * | 12/1953 | Fairbanks | F16M 11/42 180/211 |
| 2,827,690 A * | 3/1958 | Brown | B25H 1/0007 269/17 |
| 2,904,612 A | 9/1959 | Regnier | |
| 3,427,200 A | 2/1969 | Ernest et al. | |
| 3,552,941 A | 1/1971 | Giffen | |
| 3,586,492 A | 6/1971 | McMaster | |
| 3,756,797 A | 9/1973 | Akeyoshi | |
| 3,977,773 A | 8/1976 | Hubbard | |
| 4,088,470 A | 5/1978 | Bourg et al. | |
| 4,105,429 A | 8/1978 | Delgado | |
| 4,107,521 A * | 8/1978 | Winders | F24J 2/38 126/577 |
| 4,154,219 A | 5/1979 | Gupta et al. | |
| 4,180,414 A | 12/1979 | Diamond et al. | |
| 4,245,895 A | 1/1981 | Wildenrotter | |
| 4,313,746 A | 2/1982 | Juras | |
| 4,354,193 A | 10/1982 | Werner | |
| 4,404,565 A * | 9/1983 | Gurney | H01Q 15/16 343/881 |
| 4,436,373 A | 3/1984 | Kirsch | |
| 4,473,065 A | 9/1984 | Bates | |
| 4,525,196 A | 6/1985 | Fecik et al. | |
| 4,535,961 A * | 8/1985 | Sobczak | F24J 2/542 248/183.2 |
| 4,547,650 A | 10/1985 | Arditty | |
| 4,568,156 A * | 2/1986 | Dane | F24J 2/07 104/108 |
| 4,616,909 A | 10/1986 | Dane | |
| 4,678,292 A | 7/1987 | Miyatani et al. | |
| 4,805,006 A | 2/1989 | Yamagushi et al. | |
| 4,830,678 A | 5/1989 | Todorof et al. | |
| 4,999,059 A | 3/1991 | Bagno | |
| 5,118,543 A | 6/1992 | McColl | |
| 5,129,934 A | 7/1992 | Koss | |
| 5,143,535 A | 9/1992 | Herrington | |
| 5,147,437 A | 9/1992 | Bristol | |
| 5,169,456 A | 12/1992 | Johnson | |
| 5,281,249 A | 1/1994 | Hampton et al. | |
| 5,363,116 A * | 11/1994 | Allen | H01Q 1/1235 248/170 |
| 5,460,659 A | 10/1995 | Krut | |
| 5,593,901 A | 1/1997 | Oswald et al. | |
| 5,787,878 A | 8/1998 | Ratliff | |
| 6,034,319 A | 3/2000 | Falbel | |
| 6,091,017 A | 7/2000 | Stern | |
| 6,123,067 A | 9/2000 | Warrick | |
| 6,257,022 B1 | 7/2001 | Caplan et al. | |
| 6,301,932 B1 | 10/2001 | Allen et al. | |
| 6,375,135 B1 | 4/2002 | Eason et al. | |
| 6,498,290 B1 | 12/2002 | Lawheed | |
| 6,541,694 B2 | 4/2003 | Winston | |
| 6,563,040 B2 | 5/2003 | Hayden et al. | |
| 6,629,436 B1 | 10/2003 | Skeen | |
| 6,739,729 B1 | 5/2004 | Blackmon et al. | |
| 6,848,442 B2 | 2/2005 | Haber | |
| 6,895,145 B2 | 5/2005 | Ho | |
| 7,076,965 B2 | 7/2006 | Lasich | |
| 7,258,320 B2 | 8/2007 | Tai | |
| 7,297,865 B2 | 11/2007 | Terao et al. | |
| 7,380,549 B1 | 6/2008 | Ratliff | |
| 7,506,847 B2 | 3/2009 | Bailey | |
| 8,082,755 B2 | 12/2011 | Angel | |
| 8,319,697 B2 * | 11/2012 | Conrad | H01Q 1/08 343/840 |
| 8,350,145 B2 | 1/2013 | Angel | |
| 8,430,090 B2 | 4/2013 | Angel | |
| 8,505,867 B2 * | 8/2013 | Conrad | F16M 11/04 248/159 |
| 8,604,333 B2 | 12/2013 | Angel | |
| 8,662,072 B2 * | 3/2014 | Butler | F24J 2/16 126/601 |
| 9,318,635 B2 * | 4/2016 | Luo | H01L 31/052 |
| 2001/0036024 A1 | 11/2001 | Wood | |
| 2003/0005954 A1 | 1/2003 | Emoto et al. | |
| 2003/0070705 A1 * | 4/2003 | Hayden | F24J 2/5232 136/251 |
| 2004/0107731 A1 | 6/2004 | Doehring et al. | |
| 2005/0051205 A1 | 3/2005 | Mook et al. | |
| 2005/0166957 A1 | 8/2005 | Imoto et al. | |
| 2006/0054162 A1 | 3/2006 | Romeo | |
| 2006/0231133 A1 | 10/2006 | Fork | |
| 2006/0243319 A1 | 11/2006 | Kusek et al. | |
| 2007/0089774 A1 | 4/2007 | Lasich | |
| 2007/0089778 A1 | 4/2007 | Horne et al. | |
| 2007/0095341 A1 * | 5/2007 | Kaneff | F16B 2/12 126/601 |
| 2007/0256726 A1 | 11/2007 | Fork et al. | |
| 2007/0272666 A1 | 11/2007 | O'Brien | |
| 2008/0000516 A1 | 1/2008 | Shifman | |
| 2008/0047605 A1 | 2/2008 | Benitez et al. | |
| 2008/0053513 A1 | 3/2008 | Palmer | |
| 2008/0092877 A1 | 4/2008 | Monsebroten | |
| 2009/0056790 A1 | 3/2009 | Tian | |
| 2009/0277224 A1 | 11/2009 | Angel et al. | |
| 2010/0139645 A1 * | 6/2010 | Whipple | F24J 2/542 126/576 |
| 2012/0174966 A1 * | 7/2012 | Snipes | H02S 20/32 136/248 |
| 2012/0229911 A1 | 9/2012 | Rodriguez-Parada et al. | |
| 2012/0260908 A1 | 10/2012 | Orsello | |
| 2012/0316017 A1 * | 12/2012 | Chiel | F24J 2/10 474/66 |
| 2013/0206935 A1 | 8/2013 | Majid et al. | |
| 2014/0053607 A1 | 2/2014 | Angel | |
| 2014/0116419 A1 | 5/2014 | Hernandez et al. | |
| 2014/0201109 A1 * | 7/2014 | Tilley | G05B 15/02 705/412 |
| 2014/0209146 A1 * | 7/2014 | Park | F24J 2/38 136/246 |
| 2014/0238387 A1 | 8/2014 | Kroyzer et al. | |

(56) References Cited

U.S. PATENT DOCUMENTS

| | | | |
|---|---|---|---|
| 2014/0251308 A1 | 9/2014 | Wyle et al. | |
| 2014/0261387 A1 | 9/2014 | Hansen | |
| 2014/0374550 A1* | 12/2014 | Straeter | F24J 2/523 248/156 |
| 2015/0303867 A1 | 10/2015 | Angel | |
| 2015/0316639 A1* | 11/2015 | Russ | F24J 2/541 250/203.4 |
| 2015/0323124 A1* | 11/2015 | Erdos | A47B 13/00 29/428 |
| 2016/0079461 A1 | 3/2016 | Angel | |
| 2016/0238189 A1* | 8/2016 | Angel | F24J 2/542 |
| 2016/0251093 A1* | 9/2016 | Hijmans | B64G 9/00 244/173.1 |

FOREIGN PATENT DOCUMENTS

| | | |
|---|---|---|
| DE | 3104690 | 8/1982 |
| DE | 202007016715 | 3/2008 |
| EP | 1903155 | 3/2008 |
| EP | 1956662 | 8/2008 |
| EP | 1956662 | 12/2009 |
| FR | 2434343 | 4/1980 |
| GB | 770097 | 3/1957 |
| GB | 1529409 | 10/1978 |
| JP | 491610 | 1/1974 |
| JP | 58194751 | 11/1983 |
| JP | 6060934 | 4/1985 |
| JP | 2003069069 | 6/1986 |
| JP | 63021229 | 1/1988 |
| JP | 8194103 | 7/1996 |
| JP | 61119081 | 3/2000 |
| JP | 2000091612 | 3/2000 |
| JP | 2000243983 | 9/2000 |
| JP | 2003258291 | 9/2003 |
| TW | 332104 | 11/2007 |
| WO | WO2005042420 | 5/2005 |
| WO | WO2008013976 | 1/2008 |
| WO | WO2008043871 | 4/2008 |
| WO | WO2009008996 | 1/2009 |
| WO | WO2009121174 | 10/2009 |
| WO | WO2010051599 | 5/2010 |
| WO | WO2010091391 | 8/2010 |
| WO | WO2012032462 | 3/2012 |
| WO | WO2012097260 | 7/2012 |

OTHER PUBLICATIONS

International Search Report and Written Opinion dated Jan. 27, 2015 from corresponding International Application PCT/US2014/061584.
Leland, J. E90: Self-Replicating Milling Machine. Website Blog with photos [online]. Swarthmore College, 2012 [retrieved on Jul. 31, 2013].
International Preliminary Report on Patentability dated Jun. 11, 2015 from corresponding International Application PCT/US2013/071974.
International Search Report and Written Opinion dated Apr. 2, 2014 from corresponding International Application PCT/US2013/071974.
Nishi et al., USPTO Translation of JP-60-60934, created Dec. 2015, pp. 1-22.
International Search Report and Written Opinion dated Aug. 25, 2009 from International Application PCT/US2009/043381.
International Search Report and Written Opinion from Int'l Application No. PCT/US09/043377 dated May 28, 2010.
International Preliminary Report on Patentability from Int'l Application No. PCT/US09/043381 dated Aug. 16, 2010.
International Search Report and Written Opinion from Int'l Application No. PCT/US09/043378 dated Jun. 9, 2010.
Reply to EPO Communication Pursuant to Rules 161(1) and 162 EPC from related EPC Application No. 09 747 260.9, based on PCT/US2009/043378.
International Preliminary Report on Patentability from Int'l Application No. PCT/US2009/043377 (corrected version) dated Jan. 20, 2011.
Reply to EPO Communication Pursuant to Rules 161(1) and 162 EPC from corresponding EPC Application No. 09 747 261.7, based on PCT/US2009/043381.
Reply to EPO Communication Pursuant to Rules 161(1) and 162 EPC from related EPC Application No. 09 747 259.1, based on PCT/US2009/043377.
Office Action dated Nov. 23, 2012 in German Application No. 11 2009 001 132.2-33.
Office Action in Japanese Application No. 2011-509577.
Office Action in Chinese Application No. 200980116969.2.
Office Action dated Oct. 30, 2012 in Application No. GB1019206.0.
Office Action dated Nov. 16, 2012 in Chinese Application No. 200980116959.9.
Office Action dated Nov. 23, 2012 in German Application No. 11 2009 001 135.7-33.
Office Action in Mexican Application No. MX/a/2010/012356.
Office Action dated Sep. 13, 2012 in Mexican Application No. MX/a/2010/012355.
Examination Report dated Sep. 25, 2012 in European Application No. 09747261.7.
Office Action dated Aug. 22, 2012 in Japanese Application No. 2011-509579.
Examiner's Report in Australian Application No. 2009246638.
Office Action dated Sep. 25, 2012 in Japanese Application No. 2011-509578.
Examination Report dated Jul. 10, 2012 in European Application No. 09747261.7.
Examination Report dated May 21, 2012 in European Application No. 09747260.9.
Office Action in Mexican Application No. MX/a/2010/12356.
Combined Search and Examination Report dated Jul. 24, 2012 in Great Britain Application No. 1203267.8.
Examination Report dated Jul. 24, 2012 in Great Britain Application No. 1019139.3.
Office Action dated Jul. 3, 2012 in Chinese Application No. 20090116968.8.
Examiner's Report in European Application No. 09747259.1.
Examiner's Report in Great Britain Application No. 1019206.0.
AU; Examination Report dated May 9, 2011 in Application No. 2009246637.
GB; Examination Report dated Sep. 16, 2011 in Application No. GB1019160.9.
AU; Examination Report dated Oct. 4, 2011 in Application No. 2009246639.
DE; Office Action dated Jan. 10, 2012 in Application No. 11 2009 001 131.4-45.
AU; Examination Report dated May 10, 2011 in Application No. 2009246638.
KR; Notification of Provisional Rejection dated in Aug. 29, 2011 in Application No. 10-2010-7025551.
PCT; International Preliminary Report on Patentability dated Mar. 29, 2011 in Application No. PCT/US2009/043378.
GB; Examination Report dated Sep. 16, 2011 in Application No. GB1019139.3.
GB; Examination Report dated Jan. 11, 2012 in Application No. GB1019139.3.
USPTO; Restriction Requirement dated Dec. 2, 2016 in U.S. Appl. No. 14/632,637.
USPTO; Non-Final Office Action dated Jun. 17, 2015 in U.S. Appl. No. 14/071,417.
USPTO; Final Office Action dated Jan. 8, 2016 in U.S. Appl. No. 14/071,417.
USPTO; Advisory Action dated Mar. 24, 2016 in U.S. Appl. No. 14/071,417.
USPTO; Non-Final Office Action dated Aug. 17, 2016 in U.S. Appl. No. 14/071,417.
USPTO; Notice of Allowance dated Aug. 24, 2011 in U.S. Appl. No. 12/463,026.
USPTO; Notice of Allowance dated Oct. 4, 2012 in U.S. Appl. No. 12/463,016.

(56) References Cited

OTHER PUBLICATIONS

USPTO; Office Action dated Jan. 20, 2012 in U.S. Appl. No. 12/463,016.
USPTO; Office Action Restriction dated Oct. 11, 2011 in U.S. Appl. No. 12/463,016.
USPTO; Restriction Requirement dated Aug. 31, 2012 in U.S. Appl. No. 12/463,001.
USPTO; Non-Final Office Action dated Nov. 21, 2012 in U.S. Appl. No. 12/463,001.
USPTO; Notice of Allowance dated Mar. 5, 2013 in U.S. Appl. No. 12/463,001.
USPTO; Non-Final Office Action dated Feb. 14, 2013 in U.S. Appl. No. 13/302,084.
USPTO; Final Office Action dated May 29, 2013 in U.S. Appl. No. 13/302,084.
USPTO; Notice of Allowance dated Aug. 7, 2013 in U.S. Appl. No. 13/302,084.
PCT; International Search Report and Written Opinion dated Nov. 2, 2016 in Intl Application No. PCT/US16/45355.
Dan Friedman, National Solar Technology Roadmap: Concentrator PV, Management Report NREL/MP-520-41735, Solar Energy Technologies Program, Jun. 2007, pp. 1-3 (draft version), U.S. Department of Energy.
Geoffrey S. Kinsey, et al., Multijunction Solar Cells for Dense-Array Concentrators, pp. 625-627, 2006, 1-4244-0016-3, IEEE.
David Faiman, Large-Area Concentrators, 2nd Workshop on "The path to ultra-high efficient photovoltaics," Oct. 3-4, 2002, pp. 1-8, JRC Ispra, Italy.
Anja Royne, et al., Cooling of Photovoltaic Cells Under Concentrated Illumination: A Critical Review, Solar Energy Materials & Solar Cells, 2005 (available on-line Oct. 28, 2004), pp. 451-483,86, Elsevier BY.
Geoffrey S. Kinsey et al., Concentrator Multijunction Solar Cell Characteristics Under Variable Intensity and Temperature, Progress in Photovoltaics: Research and Applications, May 1, 2008 (online), pp. 503-508,16, John D Wiley & Sons, Ltd.
Sarah Kurtz, Opportunities and Challenges for Development of a Mature Concentrating Photovoltaic Power Industry, Technical Report NRELITP-5200-43208, Jun. 2011 (revised), pp. 1-32, U.S. Department of Energy.
Ugur Ortabasi et al., Dish/Photovoltaic Cavity Converter (PVCC) System for Ultimate Solar-to-Electricity Conversion Efficiency General Concept and First Performance Predictions, pp. 1616-1620, 2002, 0-7803-7471-1, IEEE.

\* cited by examiner

FRAME WITH COMPRESSION AND TENSION MEMBERS TO ROTATE EQUIPMENT ABOUT AN AXIS

CROSS REFERENCE TO RELATED APPLICATIONS

This application is a U.S. National Phase filing under 35 U.S.C. §371 of PCT/US2014/061584, filed on Oct. 21, 2014, which claims priority to U.S. Provisional Patent Application Ser. No. 61/894,337 filed on Oct. 22, 2013, both of which are incorporated herein by reference in their entirety.

FIELD OF THE INVENTION

This patent application relates to the orientation of solar mirrors or panels, radio telescopes, antennae and the like.

BACKGROUND OF THE INVENTION

In harvesting solar energy, it may be desirable to orient equipment so as to better receive the sun's rays. For example, the energy output of photovoltaic panels may be increased by orienting them to face the sun more directly as it moves across the sky. Such orientation may be desirable for the operation of solar equipment including optics to concentrate sunlight, for example, for the purpose of generating heat, or for the purpose of increasing photovoltaic cell output. Such orientation may also be desirable for the operation of heliostats, in which mirrors are oriented to direct sunlight to a tower. Alternatively, in the case of a radio antenna, orientation of a directional radio antenna may be required in order to maximize a desired signal from a radio source in the sky or to effectively communicate with a satellite or a space probe.

In a solar energy application, the orientation relative to the sun must be to an accuracy that depends on the type of supported equipment. An error of ten or more degrees may be acceptable for flat solar panels, while a few tenths of a degree of accuracy may be needed for optical concentrating equipment. Similarly, a few tenths of a degree of accuracy may be required for a high frequency radio antennae. The desired accuracy of orientation must be maintained during operation despite changes in gravitational forces resulting from varying orientations of the attached solar apparatus or antenna, or in the face of wind forces which may become larger than the force of gravity. In extreme weather the tracker may be subject to downbursts and gale force winds with a vortex or whirling component or a lift component. The rotating support must thus be able to resist strong lateral as well as vertical forces acting on the supported equipment, and large torques or bending moments about any axis.

A further constraint on rotating apparatus in some cases will be clearance to allow downward tilt of supported solar equipment, for example, a range of motion needed to follow the sun toward the horizon late in the day.

The designer of a rotating apparatus and support for a solar energy application is presented with the challenge of meeting the above technical requirements economically. For example, the marketable energy output of photovoltaic panels may be increased by around 35% if they are oriented to face the sun directly all day (as compared to static mounting), but this will be worthwhile only if the additional initial expense of manufacture and installation of a sun-tracker can be recovered through return on the additional energy generated. Thus low cost of manufacture, installation and maintenance of solar tracking equipment is an essential requirement for an apparatus to support and rotate solar equipment.

Sun-trackers can incorporate a mechanism to provide rotation about a vertical axis fixed with respect to the ground. In such an example, the equipment rotated may include solar photovoltaic panels or solar reflectors. Additional mechanisms can be included to provide rotation about a second axis. In the past, a post anchored in a ground foundation has been employed surmounted by a rotatable section to provide motion about a vertical axis (azimuth). The mechanical load acting on the supported equipment would be transmitted through the rotatable section and down the fixed post to the ground foundation. The fixed post and the rotatable section would be typically linked by one or more bearings which constrain the motion to be about the vertical axis. Rotation would be accomplished by means of a driven mechanical coupling reacting against the top of the fixed post.

In other systems, motion about a fixed azimuth axis would be provided by a bearing and platform close to the ground, or atop a tripod. Yet other forms of a sun-tracker have provided for motion in two dimensions about a universal joint rather than about specific axes.

In the past, sun-tracking systems that provide for motion about more than one axis have not been economical enough for widespread adoption. Sun-tracking systems that provide for motion about a single horizontal axis have been more economical, but nevertheless still leave room for improvement. In such systems, the horizontal axis may be defined by bearings atop a line of posts. In the past, sun-tracking systems that provide for rotation about a vertical axis have commonly been heavy and expensive. Forces and torques acting on the equipment being turned are typically reacted by large forces acting across short distances, driving up weight and cost. For example, commonly the action of lateral wind force on equipment is taken at the top of a cantilevered fixed post, resulting in amplified forces of compression and tension at the root of the fixed post. The walls of such a fixed post at its base must thus be thick and heavy to avoid failure in high wind. Similarly, the foundations supporting such a fixed post are typically massive to prevent mechanical failure at the ground attachment.

Mechanisms to drive azimuth motion also contribute to high weight and cost. Those used on top of fixed posts or other pedestals are typically constrained to be much smaller in size than the equipment they support, so as not to interfere with the full range of elevation motion of the solar apparatus. As a consequence of small size, torques on the solar apparatus from gusting wind translate into high forces at the drive mechanism, requiring use of heavy steel drive parts to avoid damage, which are relatively expensive and drive up cost.

SUMMARY OF THE INVENTION

The disclosed apparatus is designed to rotate equipment about a fixed axis, with applied loads transmitted to well-spaced ground supports in a way that makes effective and economical use of materials. The rotated equipment may include solar panels at a fixed tilt angle, or an additional mechanism may be provided for rotation about a second, orthogonal axis. In order to minimize weight and maximize stiffness, the apparatus includes tension as well as compression members, in a self-reacting stiff structure. Wind forces and torques on the rotated equipment are transmitted by the apparatus to the ground supports, appearing as predominantly lateral or vertical forces rather than torques.

In one aspect, the equipment to be rotated is attached to the upper end of an elongated rotatable compression member, which is rotatively supported at its base by a tripod comprising three additional compression members. Six tension members extending up from feet at the tripod base hold a flange through which passes the elongated rotatable compression member. The combined downward force of these tension members may act on the flange if transmitted from the flange to the elongated compression member by a large bore thrust bearing. The flange may be made small enough in diameter to avoid interfering with the full range of motion of the rotated equipment above. Lateral forces on the rotatable equipment are transmitted to the base of the apparatus by changes in tension of the six tension members. The balance of tension and compression is completed by three additional tension members around the tripod base, the whole apparatus forming a self-contained and self-reacting rigid structure. The advantages of self-reacting tension-compression structures in terms of stiffness and light weight have formed the basis of such diverse structures as umbrellas, bicycle wheels, sailing boats, and bats.

In one aspect of this invention, the elongated rotatable compression member may be driven in rotation by a large diameter but lightweight drive wheel attached to the member near its first or lower end. Axial torque acting on the rotatable compression member is carried by this member down to the drive wheel. The diameter of the wheel may be large, limited only by interference with the surrounding hexapod tension members which are widely spaced near the first end of the compression member. The drive wheel is rotated by a geared motor attached by a tripod erected from second or lower ends of the base tripod compression members. Large diameter is an advantage for the drive wheel, minimizing the forces needed to resist given axial torque on the rotated equipment and thus the weight of the wheel, while maximizing the accuracy of angular positioning.

In accordance with the present invention, an apparatus for rotatively supporting equipment is provided comprising a first elongated compression member having a first end coupled to a node comprising a rotatable bearing, said first elongated compression member having a second end; a second elongated compression member having a first end coupled to said node comprising a rotatable bearing, said second elongated compression member having a second end; a third elongated compression member having a first end coupled to said node comprising a rotatable bearing, said third elongated compression member having a second end; a rotatable fourth elongated compression member having a first end coupled to said rotatable bearing, said rotatable fourth elongated compression member having a second end, said rotatable fourth elongated compression member being supported near its second end by passing through an annular member comprising a second rotatable bearing; a first tension member coupled between the second end of said first elongated compression member and the second end of said second elongated compression member; a second tension member coupled between the second end of said second elongated compression member and the second end of said third elongated compression member; a third tension member coupled between the second end of said third elongated compression member and the second end of said first elongated compression member; a fourth tension member coupled between the second end of said first elongated compression member and a first projection on said annular member; a fifth tension member coupled between the second end of said first elongated compression member and a second projection on said annular member; a sixth tension member coupled between the second end of said second elongated compression member and the first projection on said annular member; a seventh tension member coupled between the second end of said second elongated compression member and a third projection on said annular member; an eighth tension member coupled between the second end of said third elongated compression member and the third projection on said annular member; a ninth tension member coupled between the second end of said third elongated compression member and the second projection on said annular member; where the first tension member, the second tension member, and the third tension member form a triangular shaped base; wherein the fourth tension member, the fifth tension member, the sixth tension member, the seventh tension member, the eighth tension member, and the ninth tension member form a hexapod with the three projections of the annular member forming the upper triangle of the hexapod, and the first tension member, the second tension member, and the third tension member forming the base triangle of the hexapod; and wherein said tension members and said compression members cooperate to react against each other internally in order to form a substantially rigid tension-compression structure with said structure being supported at the base triangle of the hexapod.

In addition, a drive wheel may be provided attached to the rotatable fourth elongated compression member, and a drive mechanism may be provided coupled to said drive wheel operable to turn said rotatable fourth elongated compression member. The drive mechanism may comprise a geared drive motor that turns said drive wheel by means of a barrel worm gear acting on teeth provided on said drive wheel. Alternatively, the drive mechanism may comprise a drive motor that turns said drive wheel by means of an hourglass worm gear acting on teeth provided on said drive wheel. In yet another alternative, the drive mechanism may comprise a drive motor having a sprocket connected to said drive motor, the sprocket being coupled to a chain, said drive wheel having teeth corresponding to said chain, and said drive motor turns said drive wheel using said chain.

In addition, the apparatus may include a linear actuator comprising a moveable rod, where the linear actuator is coupled to said rotatable fourth elongated compression member, the moveable rod is coupled to equipment supported on a moveable elevation axis, and whereby the equipment may be turned about the elevation axis using said linear actuator and said moveable rod.

DETAILED DESCRIPTION OF PREFERRED EMBODIMENTS

Figure 1:
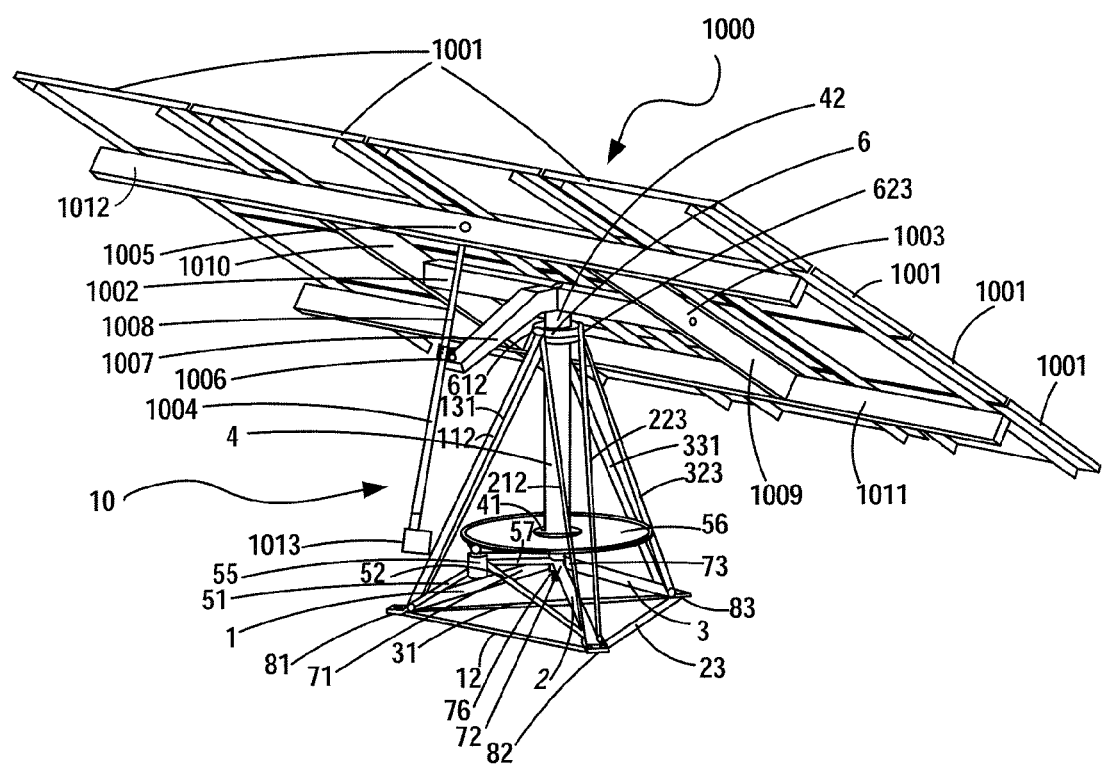
FIG. 1 is a perspective view of an embodiment of an apparatus supporting solar panels, and having an elevation drive mechanism and azimuth drive mechanism.

FIG. 1 is a perspective view of one embodiment of the disclosed apparatus, generally designated 10, which includes four elongated compression members, 1, 2, 3 and 4, each having a first end and a second end. The first elongate compression member or leg 1 has a first end 71 and a second end 81. The second elongate compression member or leg 2 has a first end 72 and a second end 82. The third elongate compression member or leg 3 has a first end 73 and a second end 83. The fourth elongate compression member 4 is shown oriented vertically in this example, and has a first end 41 and a second end 42. The fourth elongate compression member 4, described more fully below, is rotatable about its axis.

The elongate compression member 4 is rotatably supported at or near its first end 41 by the first ends 71, 72 and 73 of the members 1, 2 and 3 which meet at node 76. The members 1, 2 and 3, also referred to as legs 1, 2 and 3, have second ends 81, 82 and 83. The rotatable elongate member 4 passes through, and is rotatably supported near its second end 42, via a stationary annular element 6, which extends perpendicular to the compression member 4. The stationary annular element 6 preferably includes three projections 612, 623 and 631 (better shown in FIG. 3).

The equipment to be rotated, generally indicated with reference numeral 1000 in FIG. 1, is attached to the rotatable elongate compression member 4 at its second end 42, located above the annular element 6. All four compressive elements or compression members 1, 2, 3 and 4 are held in compression and in a stiff, stable configuration by tension members 12, 23, 31, 131, 112, 212, 223, 331 and 323, connecting the second ends 81, 82, 83 of elements 1, 2 and 3, respectively, generally with each other and to the annular element 6.

A first tension member 12 links the second end 81 of first compression member (or leg) 1 with the second end 82 of second compression member (or leg) 2. A second tension member 23 links the second end 82 of second compression member (or leg) 2 with the second end 83 of third compression member (or leg) 3. A third tension member 31 links the second end 83 of third compression member (or leg) 3 with the second end 81 of first compression member (or leg) 1.

A fourth tension member 112 links the second end of the first compression member (or leg) 1 to a first projection 612 on the stationary annular member 6. A fifth tension member 131 links the second end of the first compression member (or leg) 1 to a second projection 631 on the stationary annular member 6. A sixth tension member 212 links the second end of the second compression member (or leg) 2 to the first projection 612 on the stationary annular member 6. A seventh tension member 223 links the second end of the second compression member (or leg) 2 to a third projection 623 on the stationary annular member 6. An eighth tension member 323 links the second end 83 of the third compression member (or leg) 3 to the third projection 623 on the stationary annular member 6. A ninth tension member 331 links the second end 83 of the third compression member (or leg) 3 to the second projection 631 on the stationary annular member 6.

The nine above-described tension members 12, 23, 31, 131, 112, 212, 223, 331 and 323, apply forces that, acting through the annular element 6, serve to hold the four compression members 1, 2, 3 and 4 in compression. The nine tension members 12, 23, 31, 131, 112, 212, 223, 331 and 323, and the four compression members 1, 2, 3 and 4, in combination work together to form a self-reacting tension-compression apparatus 10 that is both stable and stiff, while allowing for rotation of element 4 about its axis. The combination self-reacting tension-compression structure 10 formed by the nine tension members 12, 23, 31, 131, 112, 212, 223, 331 and 323, and the four compression members 1, 2, 3 and 4, provides an economical support structure 10 that can withstand significant forces from both gravity and wind loading, and do so in a way that minimizes weight and cost.

Also shown in FIG. 1, rotation of the compression member 4 may be accomplished using a drive wheel 56 attached to the compression member 4 below the annular element 6, and preferably attached near the first end 41 of the member 4, where there is room for the drive wheel 56 to have large diameter. An embodiment of a drive system for rotating the fourth elongate compression member 4 about its axis is described further below in connection with FIG. 6.

Referring to FIG. 1, the first tension member 12, the second tension member 23, and the third tension member 31 form a triangular shaped base. The fourth tension member 112, the fifth tension member 131, the sixth tension member 212, the seventh tension member 223, the eighth tension member 323, and the ninth tension member 331 form a hexapod, with the three projections 612, 631 and 623 of the annular member 6 forming the upper triangle of the hexapod, and the first tension member 12, the second tension member 23, and the third tension member 31 forming the base triangle of the hexapod. The tension members 12, 23, 31, 112, 131, 212, 223, 323 and 331 and the compression members 1, 2, 3 and 4 cooperating to react against each other internally in order to form a substantially rigid tension-compression structure, where the structure is supported at the base triangle of the hexapod.

The apparatus 10 may be used to turn various configurations of equipment. In the example illustrated in FIG. 1, apparatus 10 is oriented to provide rotation of the supported equipment 1000 about an approximately vertical axis, and a mechanism is also provided for turning the supported equipment 1000 about a perpendicular, elevation or altitude axis. In the example shown in FIG. 1, the supported equipment comprises an array of photovoltaic modules 1001. These photovoltaic modules 1001 could be, for example, conventional photovoltaic panels 1001, or they could be concentrator photovoltaic cells with dish-shaped mirrors that require higher precision in their orientation toward the sun. The rotational motion provided about the axis of fourth compression member 4, and the rotational motion provided about the perpendicular elevation axis, together result in dual axis motion in azimuth and altitude.

As illustrated in FIG. 1, a beam 1002 configured perpendicular to the fourth compression member 4, is attached to the second end 42 of the rotatable element 4. When the compression member 4 rotates, the beam 1002 rotates with it. The beam 1002 has elevation bearings 1003 provided at each end, as shown in FIG. 1. The bearings 1003 are connected to first and second support members 1009 and 1010. The first support member 1009 and the second support member 1010 are connected to a third support member 1011. The first support member 1009 and the second support member 1010 are also connected to a fourth support member 1012. Together, the first, second, third and fourth support members 1009, 1010, 1011 and 1012 form a frame structure to support the photovoltaic panels 1001.

A linear actuator 1004, coupled to the fourth support member 1012, is used for rotation about an elevation axis, as shown in FIG. 1. The linear actuator 1004 comprises a moveable rod 1008. The linear actuator 1004 and the moveable rod 1008 are supported by a clevis 1006 attached to an arm 1007. The clevis 1006 is supported by the arm 1007 which is rigidly attached to the second end 42 of the rotatable member 4. The moveable rod 1008 has a ball end 1005. The ball end 1005 is attached to the fourth support member 1012. The linear actuator 1004 is operative to adjust the length of the rod 1008 between the clevis 1006 and the ball end 1005 attached to the fourth support member 1012. The elevation angle of the structure 1000 supported by the apparatus 10 is set by means of the linear actuator 1004. The adjustment of the length of the rod 1008 determines the tilt of the supporting frame formed by the first, second, third and fourth support members 1009, 1010, 1011 and 1012, and in turn, provides for motion of the supported photovoltaic modules 1001 about an elevation axis. The actuator 1004 and rod 1008 may be provided with a counterweight 1013.

Figure 2:
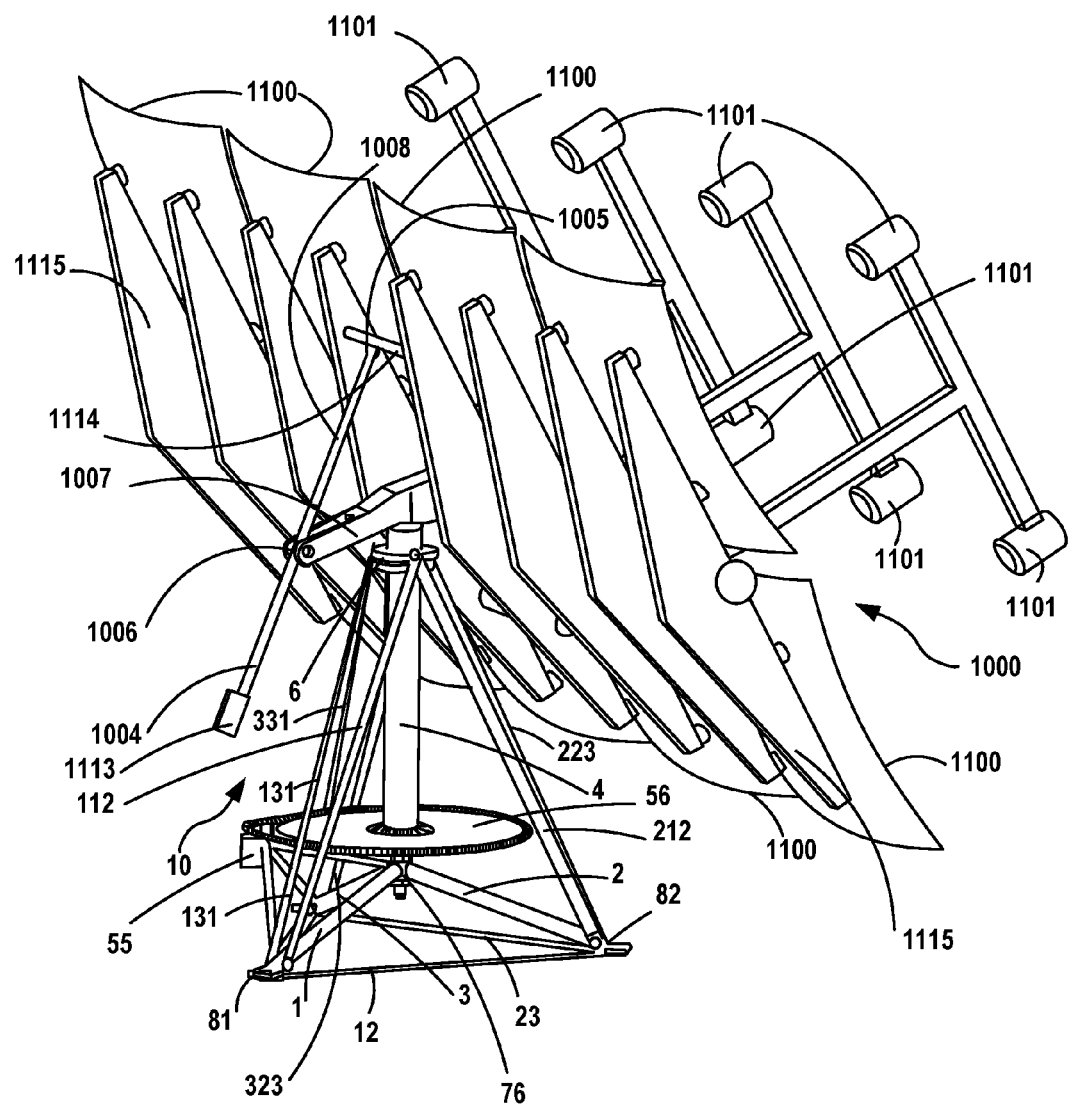
FIG. 2 is a perspective view of another embodiment of an apparatus supporting solar mirrors and photovoltaic cell generators, and having an elevation drive mechanism and azimuth drive mechanism.

FIG. 2 shows another example of use of the apparatus 10 in a solar tracker. In this example, the equipment 1000' that is rotatably carried and supported by the apparatus 10 includes dish reflectors 1100 which are oriented to face the sun. The dish reflectors 1100 concentrate sunlight onto photovoltaic cells contained in small receiver units 1101, which convert concentrated sunlight into electricity.

Rotation of the equipment 1000' shown in FIG. 2 about an elevation axis may be accomplished by a linear actuator 1004 and moveable rod 1008 supported by a suitable clevis 1006' connected to an arm 1007' attached to the rotatable member 4 in a manner similar to that described in connection with FIG. 1. The moveable rod 1008 includes a ball end 1005 attached to a support member 1114 connected to a support frame 1115 for the dish reflectors 1100. Identical elements are referred to with like reference numerals in the drawings.

Figure 3:
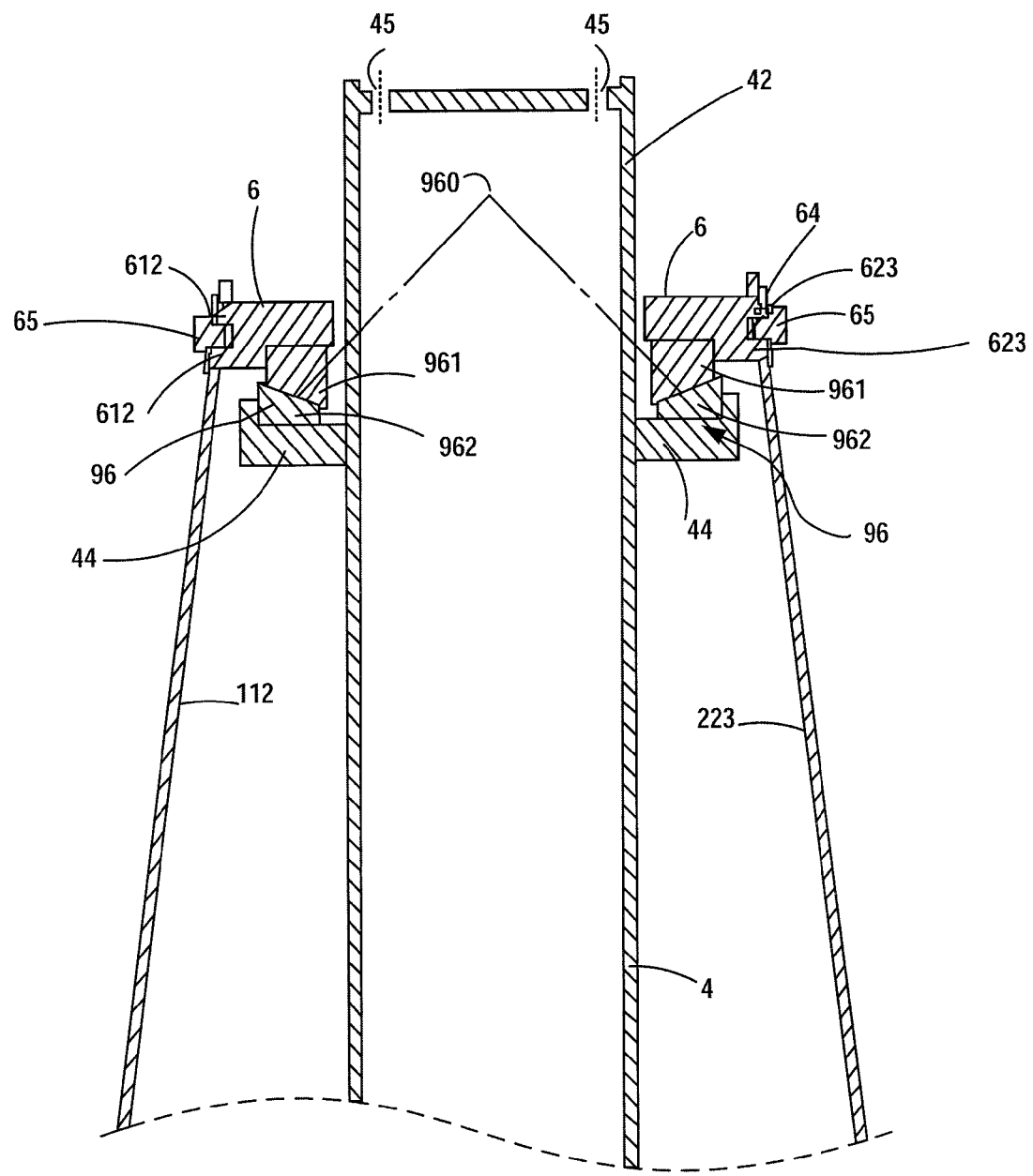
FIG. 3 is a cross-sectional view of a portion of the supporting apparatus shown in FIG. 1 and FIG. 2, illustrating a second end of the rotatable member and associated thrust bearing.
Figure 4:
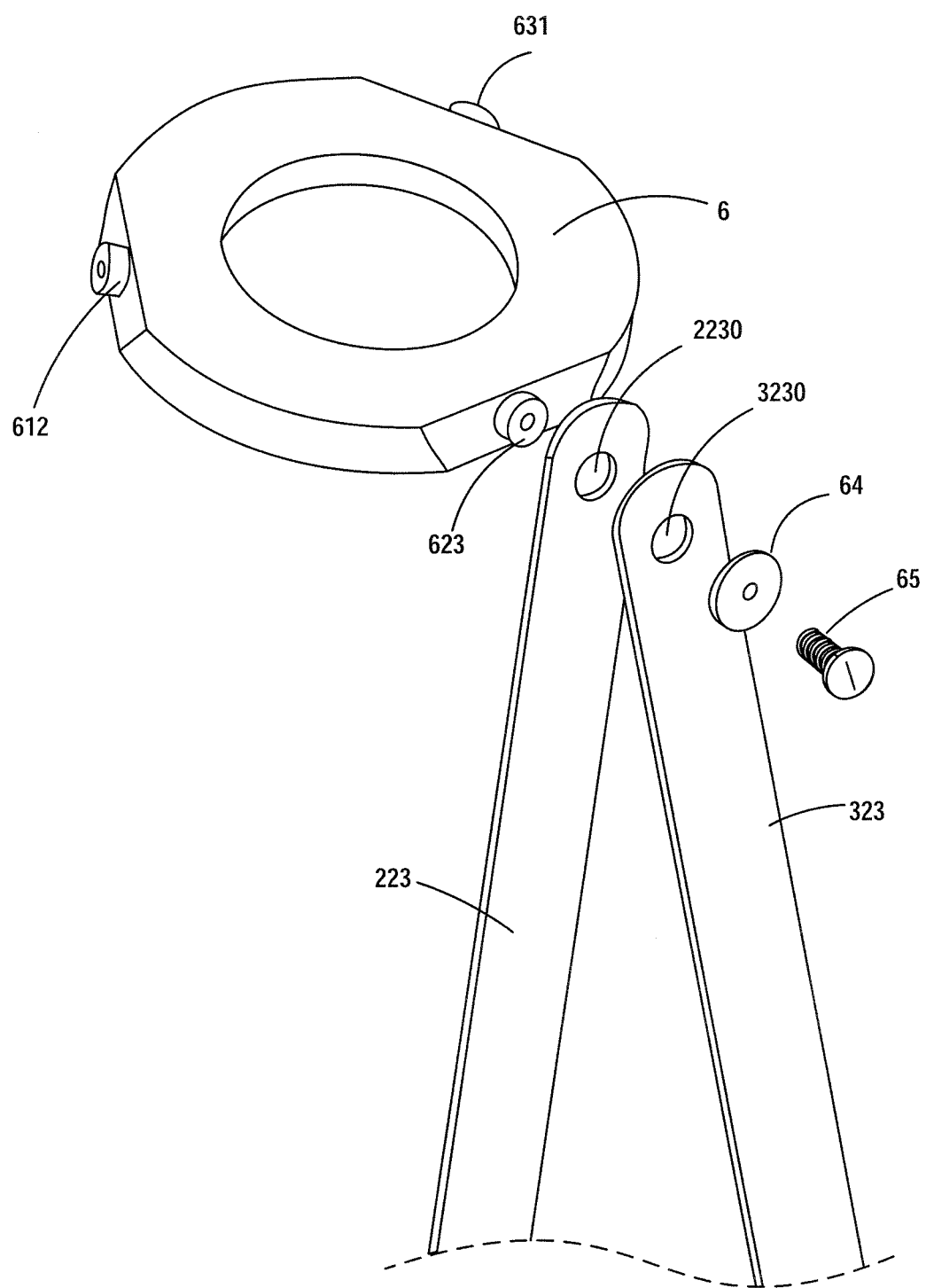
FIG. 4 is an exploded view showing tension elements attached to the bearing support flange illustrated in FIG. 1 and FIG. 2.

FIG. 3 and FIG. 4 show details of one aspect of the supporting annular element 6 and the second end of the rotatable compression member 4 shown in the embodiments described above with reference to FIG. 1 and FIG. 2.

Referring to FIG. 3, the rotatable compression member 4 is provided with a fixedly attached flange 44. Alternatively, the flange 44 may be formed as an integral part of the rotatable member 4. The flange 44 supports a spherical thrust bearing 96. The spherical thrust bearing 96 has a lower bearing part 962 and a stationary bearing part 961. The lower part 962 of the bearing 96 turns with the flange 44. The stationary part 961 of the bearing 96 does not turn, and is connected to the stationary annular element 6 in fixed relationship with the annular element 6.

The stationary annular element 6 is provided with three projections 612, 623 and 631, for attachment of tension members to constrain lateral and rotational motion of the stationary annular element 6. For clarity of illustration in FIG. 3, two projections 612 and 623 are shown schematically in the cross-sectional view as though they are opposite each other, but in practice the three projections 612, 623 and 631 are uniformly distributed around the flange at approximately 120° intervals.

Each projection 612, 623 and 631 supports two tension members or tension elements 131, 112, 212, 223, 331 and 323, respectively. Thus, fourth tension member 112 and sixth tension member 212 are supported by the projection 612. Fifth tension member 131 and ninth tension member 331 are supported by the projection 631. Seventh tension member 223 and eighth tension member 323 are supported by the projection 623.

Referring to FIG. 3, projection 612 is shown carrying tension element 112, and although it is omitted for the sake of clarity, projection 612 would also carry tension element 212. FIG. 3 also shows projection 623 carrying tension element 223. Projection 623 would also carry tension element 323, which has been omitted from FIG. 3 for the sake of clarity. Projection 631, not shown in the view provided in FIG. 3, carries tension elements 331 and 131. The combined downward force of the six tension elements 131, 112, 212, 223, 331 and 323 is carried through the bearing 96 to the compression element 4, while leaving the compression element 4 free to rotate about the center point 960 of a sphere defined by the bearing surfaces between the lower bearing part 962 and the stationary bearing part 961.

In a preferred embodiment of the example shown in FIG. 3, the bearing 96 may be a tapered roller spherical bearing 96. A tapered roller spherical bearing is convenient because of its tolerance to misalignment, but it will be understood by those skilled in the art that other bearings 96 capable of withstanding compressive and axial loads, such as paired axial and lateral bearings, could also be used.

FIG. 4 is an exploded partial view showing an aspect of the attachment of the tension elements 131, 112, 212, 223, 331 and 323 at the projections 612, 623 and 631. A bolt 65 and a washer 64 may be used to attach tension the elements 131, 112, 212, 223, 331 and 323 to the projections 612, 623 and 631, respectively. In the illustrated example, the bolt 65 and the washer 64 do not themselves carry a tension load. The bolt 65 and the washer 64 are provided to keep the respective tension elements 131, 112, 212, 223, 331 and 323 in place.

In FIG. 4, the annular flange 6 is shown with three projections 612, 623 and 631. Details of the attachment are shown for just projection 623; it will be understood that a similar attachment is made for the other two projections 612 and 631.

Tension element 223 is provided with an opening 2230 which fits closely around the projection 623. Tension element 323 is provided with an opening 3230 which fits closely around the projection 623. The cylindrical perimeter of the projection 623 is perpendicular to the direction of the tension forces acting along tension element 223 and tension element 323. In this way, the bolt 65 and the washer 64 do not carry the load.

Tension elements 331 and 131 are similarly attached to the projection 631 in the manner described above with reference to FIG. 4. Tension elements 212 and 112 are similarly attached to the projection 612 in the manner described above with reference to FIG. 4.

It will be apparent to those skilled in the art after having the benefit of this disclosure that alternate tension elements, for example cables with looped ends, and alternate methods of attachment, could be used while remaining within the spirit and scope of this invention.

Figure 5:
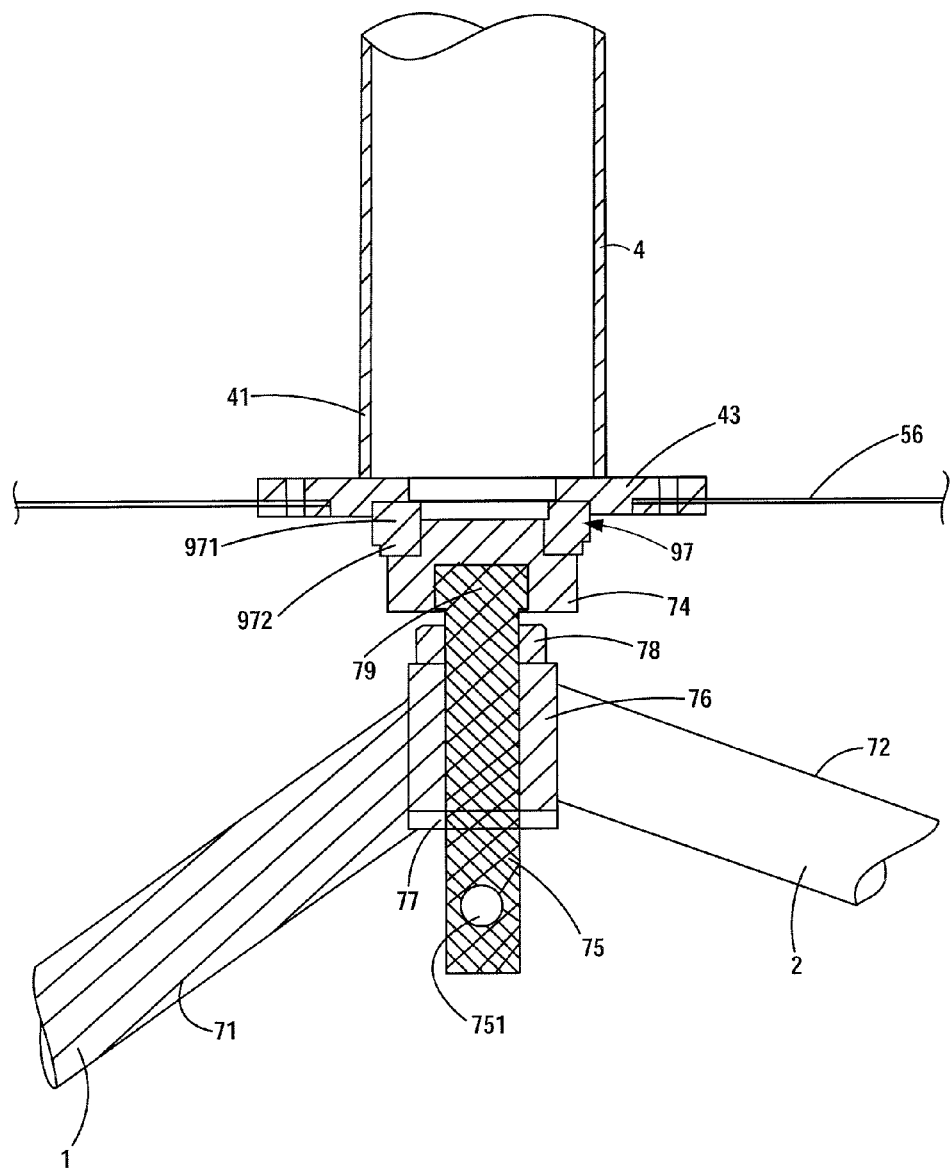
FIG. 5 is a schematic cross-sectional view of a portion of the supporting apparatus shown in FIG. 1 and FIG. 2, illustrating a first end of the rotatable member and associated thrust bearing and axial tension adjustment.

FIG. 5 shows additional detail for an embodiment of a rotatable support located at the first end 41 of the compression member 4. In this example, the compressive load on the rotatable member 4 is transmitted through a spherical thrust bearing 97 to the fixed node 76 at the meeting point of the first ends 71, 72 and 73 of the three legs 1, 2 and 3, respectively, via a threaded bolt 75 secured by nuts 77 and 78 to the node 76. The first end 41 of the compression member 4 is terminated via a flange 43 in which is seated the rotating part 971 of the spherical thrust bearing 97. The spherical thrust bearing 97 transmits the compressive load to the bolt 75 via a lower stationary part 972 of the bearing 97, set in a flange 74 which receives the head 79 of the bolt 75. The lateral and axial motion of the first end 41 of the compression element 4 is thus constrained by the thrust bearing 97.

Adjustment of axial position is obtained by loosening the lower nut 77, constraining rotation of the bolt 75 by means of a rod passed through the hole 751, and then by engaging a wrench and turning a tensioning nut 78. In this manner, the bearing 97, and along with it the compression member 4, may be raised or lowered. The result of raising the member 4 by turning the tensioning nut 78 is to simultaneously tension the members 12, 23, 31, 162, 163, 263, 261, 361 and 362, while placing in compression the compression members 1, 2, 3 and 4. Once the height and level of tension and compression is correctly set, they are all locked in by tightening the lower lock nut 77.

Figure 7:
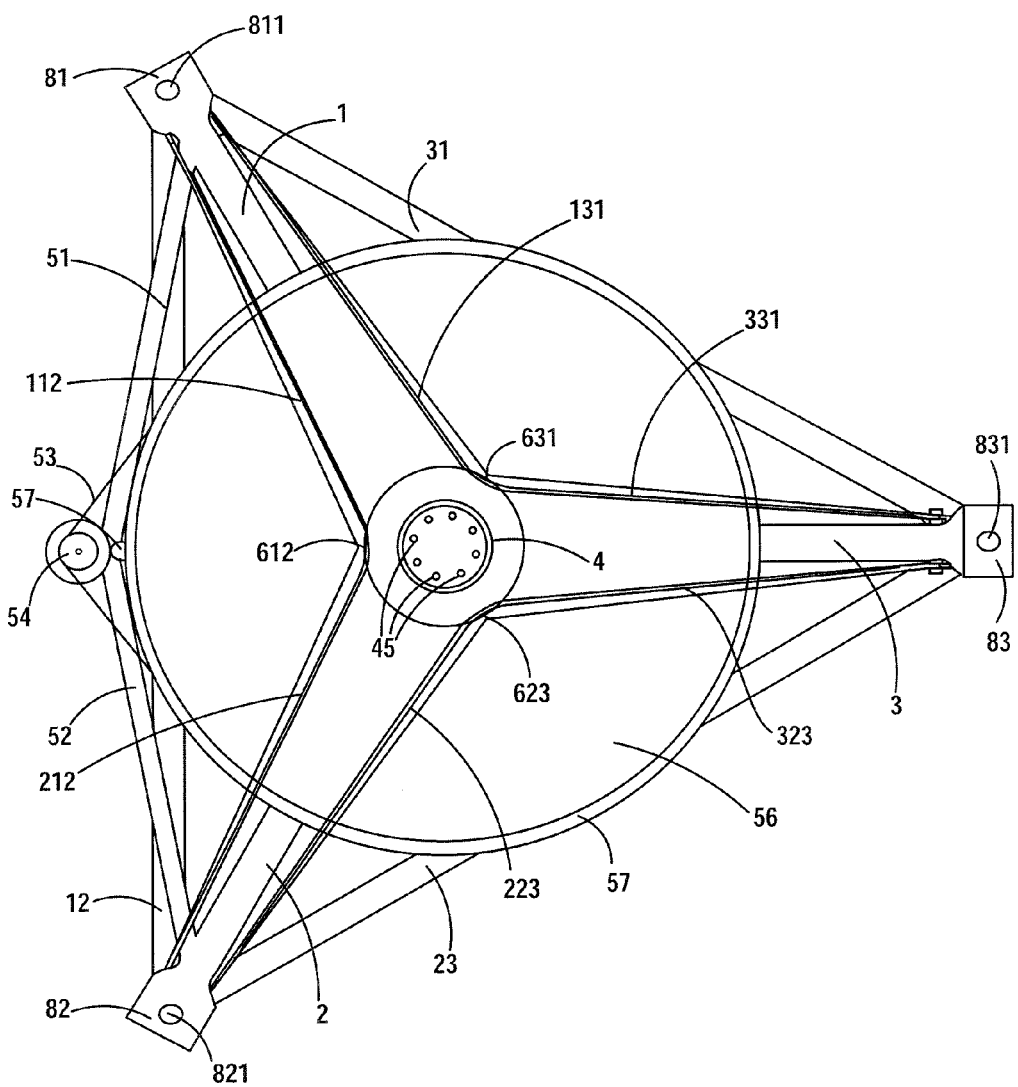
FIG. 7 is a plan view of the supporting apparatus according to the examples shown in FIG. 1 and FIG. 2.

FIG. 7 shows in plan view the assembled apparatus, ready for installation in the field. In this example, the tension elements have been pre-adjusted to the required level to resist wind loads.

Figure 6:
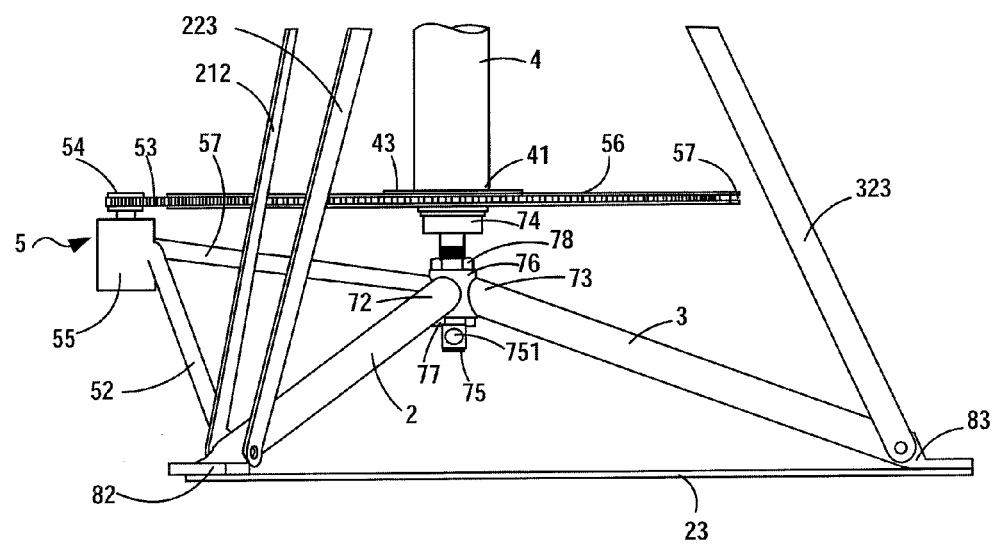
FIG. 6 is a perspective view of a chain drive for the apparatus according to the examples shown in FIG. 1 and FIG. 2.

FIG. 6 and FIG. 7 illustrate in more detail an embodiment of a drive mechanism 5 used to drive the compression element 4 in rotation. A drive wheel 56 is attached to the flange 43 connected to the first end 41 of the compression element 4. The drive wheel 56 may be driven in rotation by a chain 53 which is set in a channel 57 formed at the perimeter of the drive wheel 56. The chain 53 passes around a drive sprocket 54, which is turned by a motor and gear assembly 55.

As shown in FIG. 5 and FIG. 6, the motor and gear assembly 55 are supported by members 51, 52 and 57, which form a tripod linking the motor and gear assembly 55 to the second end 81 of compression member 1, to the second end 82 of the compression member 2, and to the node 76 at the junction of the first ends 71, 72 and 73 of the compression members 1, 2 and 3, respectively.

It will be apparent to those with normal skill in the art that the chain drive illustrated in the examples depicted in the drawings is only one example of a lightweight drive mechanism taking advantage of a large diameter wheel. Other drive mechanisms, including for example, a belt drive, a geared drive with a planetary gear, a geared drive with an hourglass gear, or a geared drive with a barrel worm gear, could be used. The gear drives could have gear teeth external or internal to the large diameter drive wheel, all as will be apparent to those skilled in the art after having the benefit of this disclosure.

Holes 45 may be provided in the end of the compression member 4 for purposes of drainage, if desired.

Figure 8:
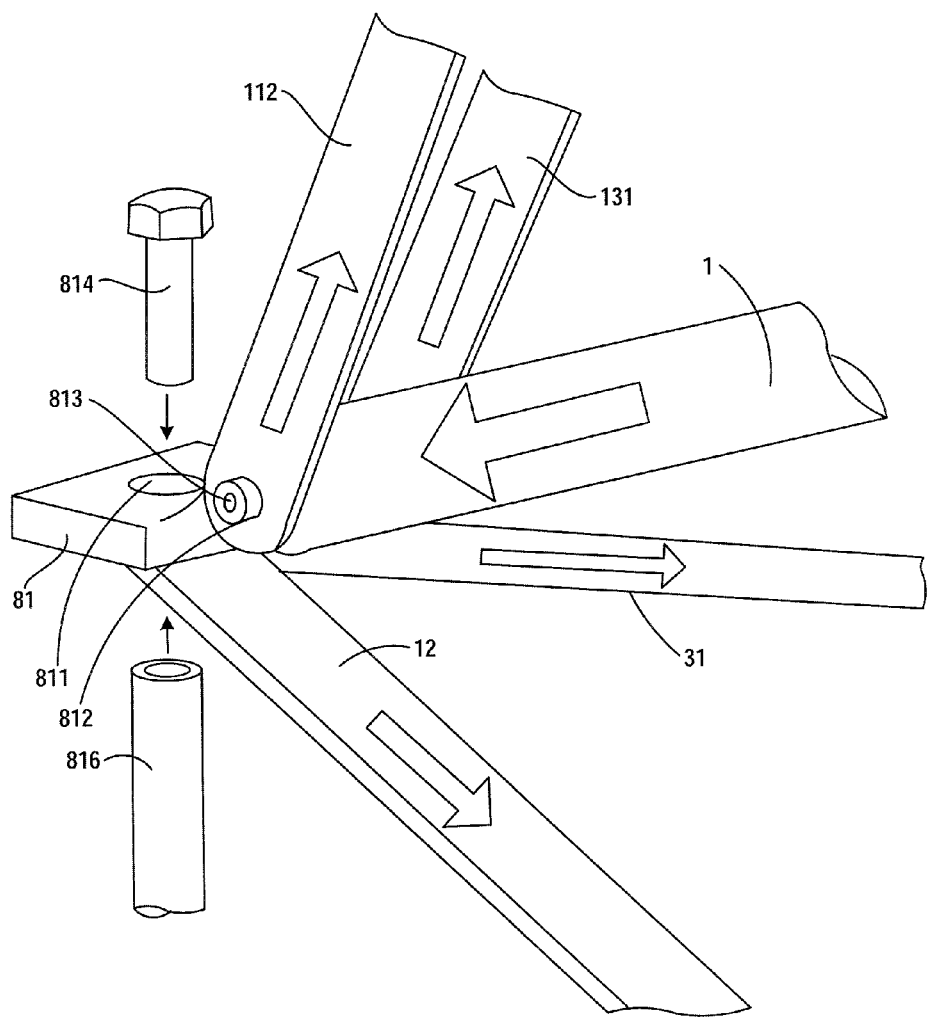
FIG. 8 is a partially exploded perspective view illustrating in detail the balance of tension and compression forces at the second end of a compression element in accordance with the examples shown in FIG. 1 and FIG. 2.

FIG. 8 illustrates the balance of tension and compression forces at the second end 81 of the compression member 1, which may be established in the apparatus 10 by adjustment of the nut 78 shown in FIG. 5 and in FIG. 6.

Referring to FIG. 8, the fourth tension member 112 and the fifth tension member 131 are connected to the compression element 1 via projections on either side of the first end 81 of the compression element 1. The fourth tension member 112 is provided with an opening similar to the opening 2230 in tension element 223 shown in FIG. 4 so as to loop around and fit closely to the corresponding projection 812 on the first end 81 of the compression element 1. Similarly, the fifth tension member 131 shown in FIG. 8 is provided with an opening similar to the opening 3230 in tension element 323 shown in FIG. 3 so as to loop around and fit closely to a corresponding projection on the first end 81 of the compression element 1.

Referring to FIG. 8, the fourth tension member 112 may be secured in place by a bolt 813 and a washer, which may be configured similar to the arrangement shown in FIG. 4 and FIG. 3. The fifth tension member 131 shown in FIG. 8 may be secured in place using a similar bolt and washer arrangement. Referring to FIG. 8, the fourth tension member 112 and the fifth tension member 131 may alternatively be attached to the first end 81 of the compression element 1, for example, by welding.

The arrows shown in FIG. 8 illustrate schematically the balance of forces. The force of compression on the second end 81 of the compression member 1 is balanced by the combined action of the tension forces in first tension member 12, third tension member 31, fourth tension member 112, and fifth tension member 131. The second end 81 of the compression member 1 is provided with a mounting hole 811. In one aspect, ground attachment may be by a bolt 814 into a receiving threaded hole 811. In another aspect, ground attachment may be by placement of the hole 811 over a threaded stud 816 attached to a ground anchor, which may be secured by a nut. It should be apparent to those skilled in the art that the forces carried by the bolt 814 or stud 816 may transmit gravity and wind loads experienced by the apparatus as a rigid body. The balancing forces shown that maintain the structural integrity of the tension/compression design may be separate, and internal to the apparatus 10.

Figure 9:
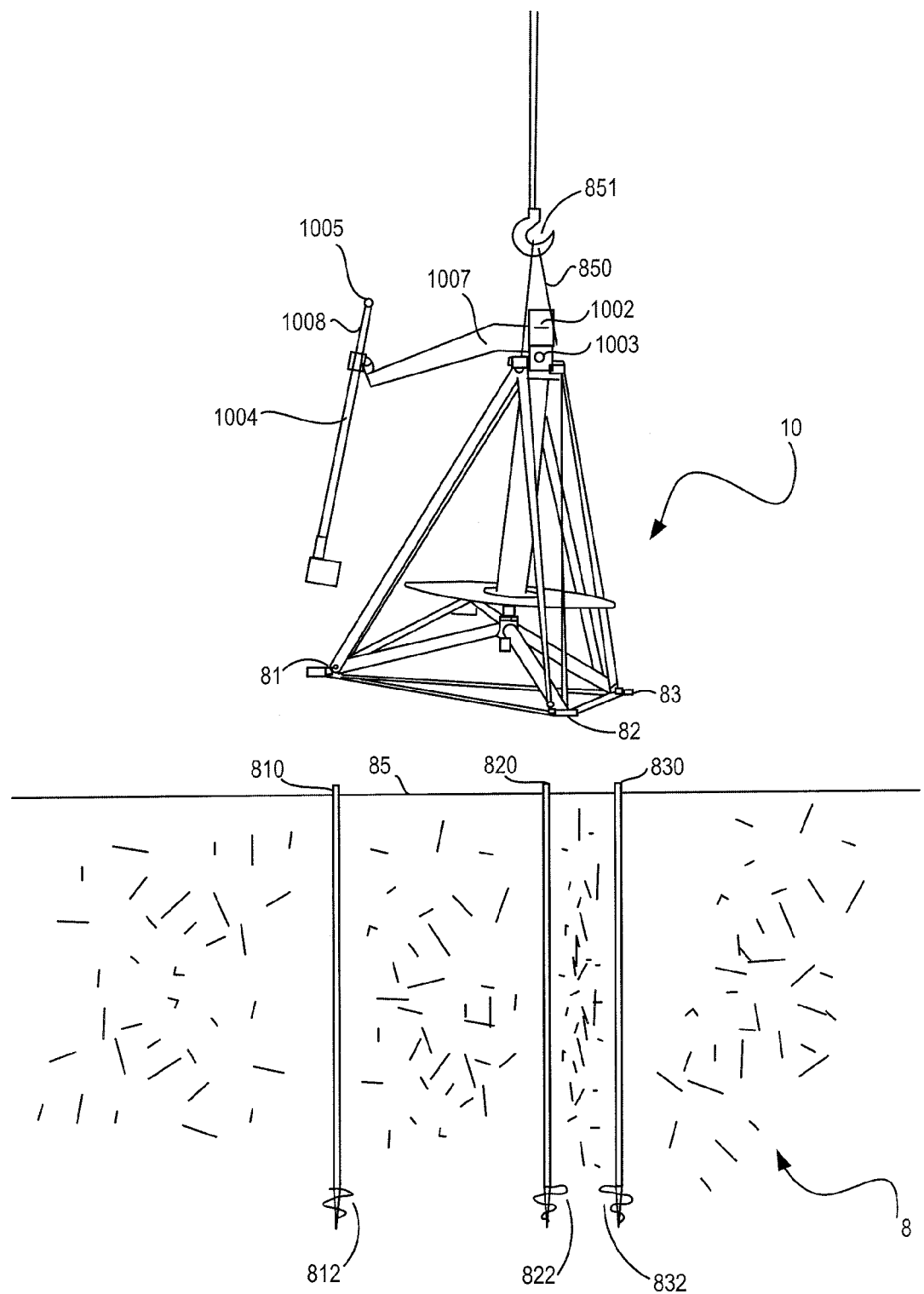
FIG. 9 is a partially exploded perspective and cross-sectional view of ground anchors and field installation of an apparatus according to the examples shown in FIG. 1.

FIG. 9 illustrates an example of a ground foundation suitable for supporting the apparatus 10. In this example, the ground foundations may consist of three helical screw anchors 812, 822 and 832, respectively. These anchors 812, 822 and 832 may be screwed directly into the ground 8 in a triangular pattern to match holes 811, 821 and 831 in the second ends 81, 82 and 83 of the compression members 1, 2 and 3, respectively. The anchors 812, 822 and 832 are screwed in to a depth such that their upper ends 810, 820 and 830 stand slightly above the ground level 85. The upper ends 810, 820 and 830 of the anchors 812, 822 and 832 may be equipped with tapped holes or threaded studs, (such as the threaded stud 816 shown in FIG. 8), ready to secure the apparatus 10 to the ground at the second ends 81, 82 and 83 of the compression members 1, 2 and 3, respectively. It will be understood by those skilled in the art that different ground foundations and alternative methods of securing the apparatus 10 to the ground 8 could be used.

FIG. 9 also illustrates an aspect of the installation process. The tension and compression forces may have already been set during pre-assembly, and prior to attachment of the apparatus 10 to the ground 8. In the illustrated example, a perpendicular beam 1002 carried by the rotating compression element 4 has already installed, along with the elevation support arm 1007 and actuator 1004. This assembly may be lifted via a crane hook 851 and sling 850 about the arm 1002, and lowered into position so that the second ends 81, 82 and 83 of the compression members 1, 2 and 3, respectively, may be secured to the tops 810, 820 and 830 of the screw anchors 812, 822 and 832, respectively.

In this way, the invention lends itself to rapid and economical installation. Screw anchors are lightweight and rapidly placed. Installation as shown in FIG. 9 can follow immediately, after anchor placement, because no concrete is required. The apparatus is not subject to any shocks from pounding during installation by bolt attachment. It is thus feasible and advantageous to pre-assemble the apparatus with the elevation drive already in place as shown in FIG. 9, and with both drive motors and controls already installed, along with components of the solar controls and electronics, as desired. The remaining installation step is then to connect the solar array 1000 at just three points, to the two elevation bearings 1003 and to the elevation drive ball end 1005.

It will be understood by those with ordinary skill in the art that other means of anchoring the second ends 81, 82 and 83 of the compression members 1, 2 and 3, respectively, to the ground 8 might be used, depending on local conditions, while remaining within the scope of this invention.

Figure 10A:
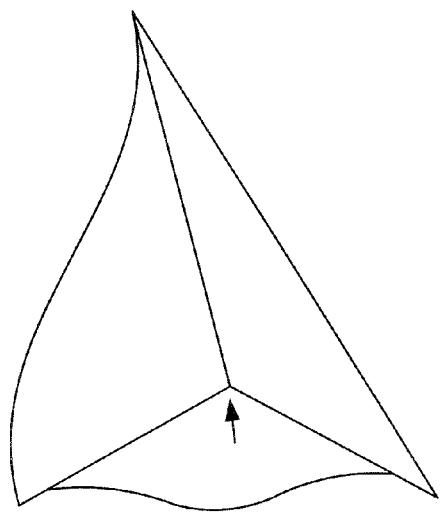
FIG. 10a is a schematic diagram illustrating structure of a tracker before tension action.
Figure 10B:
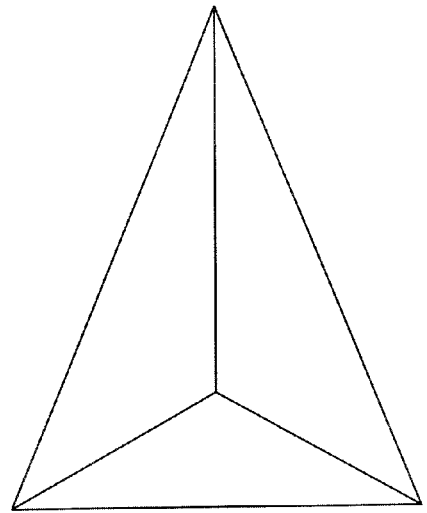
FIG. 10b is a schematic diagram illustrating structure of a tracker after tension action.

FIG. 10*a* and FIG. 10*b* show schematically how the nut in a simplified tension/compression design tightens and stiffens the entire structure for the tracker. In FIG. 10*a* the tension and compression elements have their correct lengths, but the upper compression element has not yet been driven up. Some of the tension elements are slack, and the geometry is incorrect. After tightening by pushing up the fourth compression element 4, as shown in FIG. 10*b*, this single action causes the apparatus 10 to become stiff and take on the correct shape.

Figure 11A:
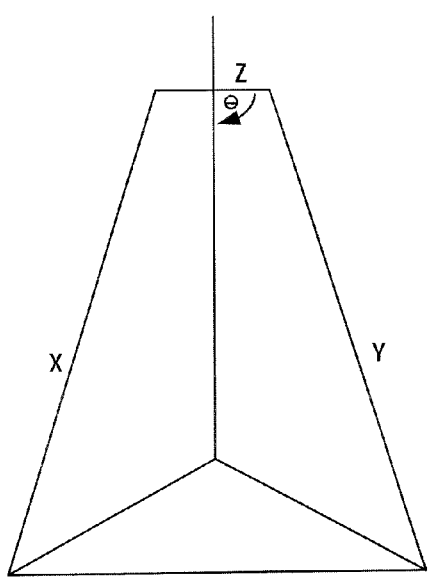
FIG. 11a is a schematic diagram illustrating (together with FIG. 11b) the effect of an error in tension element length.
Figure 11B:
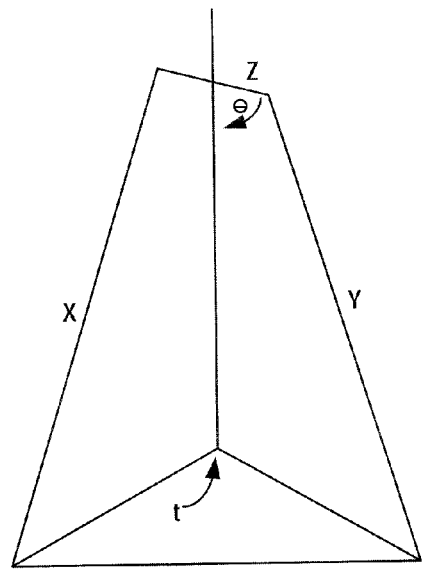
FIG. 11b is a schematic diagram illustrating (together with FIG. 11a) the effect of an error in tension element length.

FIG. 11*a* and FIG. 11*b* illustrate another important property of the invention. It is desirable to address a situation where the lengths of the tension and compression elements may not be exactly accurate. In the event that the lengths of the tension and compression elements deviate from the predetermined desired lengths, the spherical thrust bearings in accordance with the present novel design allow the flange 6 to tilt in order to compensate, leaving the structure with its full stiffness and integrity, with slightly changed geometry. As a result of the novel design in accordance with the present invention, the slightly changed geometry is inconsequential.

FIG. 11*a* shows a simplified and schematic case with two tension elements which are of the same length. Tightening then results in the compression member "z" being perpendicular, and the angle theta of the spherical bearing is at its nominal value of 90 degrees. FIG. 11*b* shows the case in which the tension element "y" is short. Now after tightening, the vertical compression member will not be quite as high, and the spherical bearing will be tilted, with an angle theta that is less than 90 degrees. However, the balance of tension and compression will remain, and the spherical bearing will perform just as well. Thus, good performance of the invention does not require accurate dimensional tolerances, which is an important factor in driving down cost and a significant advantage of the present invention.

Figure 12A:
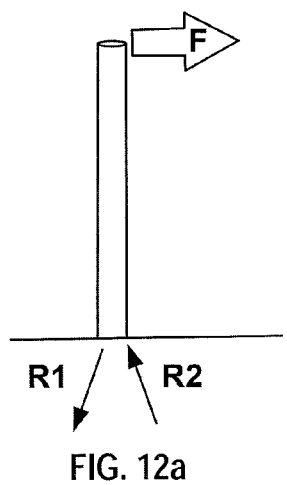
FIG. 12a is a schematic diagram illustrating reactions to wind forces.
Figure 12B:
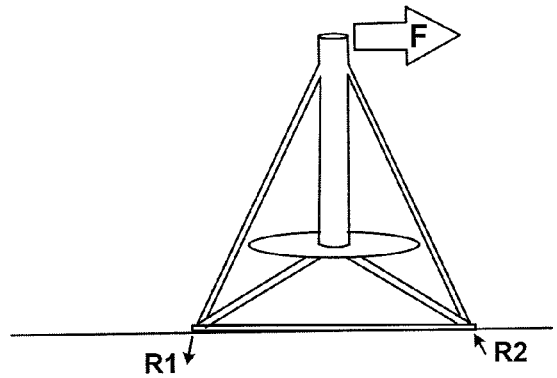
FIG. 12b is a schematic diagram illustrating reactions to wind forces.

FIG. 12*a*, FIG. 12*b*, FIG. 12*c*, and FIG. 12*d* compare the effect of lateral wind forces and torques on a conventional post support and on the apparatus of this invention. In FIG. 12*a*, a lateral wind force acting at the top of a post exerts a bending force at the ground, which must be reacted by strong, largely vertical forces in the foundation. The same wind force applied to the apparatus 10 according to the present invention is reacted by much weaker foundation reaction forces over a broader base, as shown in FIG. 12*b*. As a consequence, the apparatus may be much more lightly built, which may significantly reduce cost.

Figure 12C:
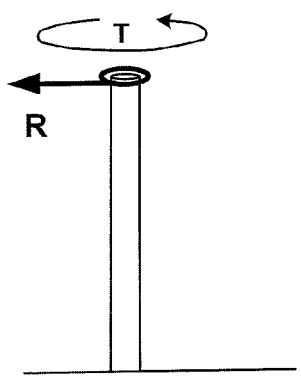
FIG. 12c is a schematic diagram illustrating reactions to wind forces.
Figure 12D:
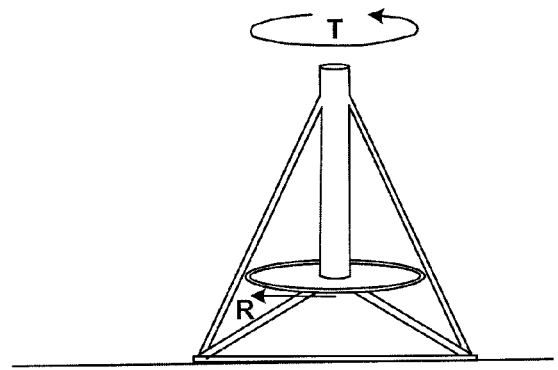
FIG. 12d is a schematic diagram illustrating reactions to wind forces.

FIG. 12*c* illustrates the different action of a twisting force or torque "T" applied to the post, as might be caused by a wind vortex. A large reaction force "R" is required if a conventional drive wheel of small diameter is used, as illustrated in FIG. 12*c*. The same torque "T" applied to the apparatus 10 according to the present invention is carried down to a large drive wheel, made possible by the downward translation of torque by the extended compression member 4, and is reacted by a much smaller reaction force at the wheel's edge, as shown in FIG. 12*d*. Again, as a consequence, the drive mechanism may be much more lightly built, which may significantly reduce cost.

Those skilled in the art, after having the benefit of this disclosure, will appreciate that modifications and changes may be made to the embodiments described herein, different materials may be substituted, equivalent features may be used, changes may be made in the dimensions of the apparatus, and additional elements may be added, all without departing from the scope and spirit of the invention. This disclosure has set forth certain presently preferred embodiments and examples only, and no attempt has been made to describe every variation and embodiment that is encompassed within the scope of the present invention. The scope of the invention is therefore defined by the claims appended hereto, and is not limited to the specific examples set forth in the above description.

What is claimed is:

1. An apparatus for rotatively supporting equipment, comprising:
    a first elongated compression member having a first end coupled to a node comprising a rotatable bearing, said first elongated compression member having a second end;
    a second elongated compression member having a first end coupled to said node, said second elongated compression member having a second end;
    a third elongated compression member having a first end coupled to said node, said third elongated compression member having a second end;
    a rotatable fourth elongated compression member having a first end coupled to said rotatable bearing, said rotatable fourth elongated compression member having a second end, said rotatable fourth elongated compression member being supported near its second end by passing through an annular member comprising a second rotatable bearing;
    a first tension member coupled between the second end of said first elongated compression member and the second end of said second elongated compression member;

a second tension member coupled between the second end of said second elongated compression member and the second end of said third elongated compression member;

a third tension member coupled between the second end of said third elongated compression member and the second end of said first elongated compression member;

a fourth tension member coupled between the second end of said first elongated compression member and a first projection on said annular member;

a fifth tension member coupled between the second end of said first elongated compression member and a second projection on said annular member;

a sixth tension member coupled between the second end of said second elongated compression member and the first projection on said annular member;

a seventh tension member coupled between the second end of said second elongated compression member and a third projection on said annular member;

an eighth tension member coupled between the second end of said third elongated compression member and the third projection on said annular member;

a ninth tension member coupled between the second end of said third elongated compression member and the second projection on said annular member;

the first tension member, the second tension member, and the third tension member forming a triangular shaped base said triangular shaped base forming a base of a hexapod;

the fourth tension member, the fifth tension member, the sixth tension member, the seventh tension member, the eighth tension member, and the ninth tension member forming the hexapod, with the three projections of the annular member forming an upper triangle of the hexapod; and, wherein said tension members and said compression members cooperating to react against each other internally in order to form a substantially rigid tension-compression structure, said structure being supported at said triangular shaped base of the hexapod.

2. The apparatus according to claim 1, further comprising:
a drive wheel attached to said rotatable fourth elongated compression member; and,
a drive mechanism coupled to said drive wheel operable to turn said rotatable fourth elongated compression member.

3. The apparatus according to claim 2, wherein:
said drive mechanism comprises a geared drive motor that turns said drive wheel by means of a barrel worm gear acting on teeth provided on said drive wheel.

4. The apparatus according to claim 2, wherein:
said drive mechanism comprises a drive motor coupled to said drive wheel.

5. The apparatus according to claim 2, wherein:
said drive mechanism comprises a drive motor having a sprocket connected to said drive motor, the sprocket being coupled to a chain, said drive wheel having teeth corresponding to said chain, and said drive motor turns said drive wheel using said chain.

6. The apparatus according to claim 2, further comprising:
a linear actuator comprising a moveable rod, the linear actuator being coupled to said rotatable fourth elongated compression member, the moveable rod being coupled to equipment supported on a moveable elevation axis, whereby the equipment may be turned about the elevation axis using said linear actuator and said moveable rod.

7. The apparatus according to claim 2, further comprising:
a plurality of ground supports attached to said base triangle of the hexapod.

8. The apparatus according to claim 7, wherein:
said ground supports comprise a plurality of screw anchors.

9. The apparatus according to claim 1, further comprising:
a plurality of ground supports attached to said base triangle of the hexapod.

10. The apparatus according to claim 9, wherein:
said ground supports comprise a plurality of screw anchors.

* * * * *